(12) United States Patent
Iwasa et al.

(10) Patent No.: US 7,615,886 B2
(45) Date of Patent: Nov. 10, 2009

(54) ELECTRONIC APPARATUS AND COMPUTER-EXECUTABLE PROGRAM

(75) Inventors: Naoki Iwasa, Kawasaki (JP); Teruhiko Kimura, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 11/311,231

(22) Filed: Dec. 20, 2005

(65) Prior Publication Data
US 2007/0046104 A1    Mar. 1, 2007

(30) Foreign Application Priority Data
Aug. 31, 2005   (JP) .............................. 2005-252144

(51) Int. Cl.
   *H02J 3/00*   (2006.01)
(52) U.S. Cl. ....................................................... 307/26
(58) Field of Classification Search ................... 307/26
   See application file for complete search history.

(56) References Cited

U.S. PATENT DOCUMENTS

| | | | |
|---|---|---|---|
| 6,483,746 B2* | 11/2002 | Haraguchi et al. ...... | 365/185.08 |
| 7,157,880 B2* | 1/2007 | Kubota ....................... | 320/106 |
| 2002/0064112 A1* | 5/2002 | Seo .......................... | 369/53.18 |
| 2002/0065618 A1 | 5/2002 | Oh ............................. | 702/57 |

FOREIGN PATENT DOCUMENTS

| CN | 1355458 A | 6/2002 |
|---|---|---|
| CN | 2599596 Y | 1/2004 |
| JP | 04-010017 | 1/1992 |
| JP | 04-123119 | 4/1992 |
| KR | 2002-0041615 | 6/2002 |

OTHER PUBLICATIONS

Notification of Submission of Arguments issued Dec. 8, 2006 in corresponding Korean Patent Application No. 10-2005-0122343.
First Notification of Office Action issued by the State Intellectual Property Office of China on Oct. 12, 2007 in the corresponding Chinese Application No. 200510135039.5 (5 pages) with English translation including English translation of Text of the First Office Action (6 pages in English language).

* cited by examiner

*Primary Examiner*—Stephen W Jackson
*Assistant Examiner*—Carlos Amaya
(74) *Attorney, Agent, or Firm*—Staas & Halsey LLP (57) ABSTRACT

An information apparatus 1 receiving power from a portable power source 16 is provided with an external power receiving section 17 receiving the power by connection to non-portable power sources 20 and 21; an operation section SW switching supply and cutoff of the power from the non-portable power sources 20, 21 that are connected to the portable power source 16 or to the external power receiving section 17; judging sections 11 and 19 for judging, when the information apparatus 1 is activated by the supply of power, whether or not the activation is a first activation since the information apparatus 1 is shipped from a factory; and an informing section 13 for prompting a user to connect the external power receiving section 17 to the non-portable power sources 20 and 21 when the activation is the first activation since the information apparatus 1 is shipped.

12 Claims, 4 Drawing Sheets

```
WHEN YOU TURN ON THE APPARATUS FOR THE FIRST TIME
BE SURE TO CONNECT THE AC ADAPTER TO THE APPARATUS.
CONNECT THE AC ADAPTER OR PRESS THE F1 KEY
AND THEN THE APPARATUS CONTINUES TO OPERATE.

IF THE AC ADAPTER IS NOT CONNECTED
THE REMAINING BATTERY IS EXHAUSTED DURING THE SETUP
OF THE OS AND YOU MAY FAIL TO SET UP THE OS.
```

FIG. 3

FIG. 4

ELECTRONIC APPARATUS AND COMPUTER-EXECUTABLE PROGRAM

BACKGROUND OF THE INVENTION

The present invention relates to an electronic apparatus such as a computer that can be utilized with a portable power source and a computer program that is executed on such an electronic apparatus.

In some electronic apparatuses including a notebook type personal computer, a remaining capacity of a battery installed on the apparatus becomes low after the apparatus is shipped. At the time of shipping of the apparatus, the battery is charged to some degrees. However, the remaining battery capacity is gradually decreased during a time period from the time after the shipment of the apparatus and delivery of the apparatus to a user and until the time of an actual use of the apparatus by the user.

In the apparatus like this, when the user activates the apparatus for the first time after the user purchases the apparatus, it is necessary for the user, first, to construct a system environment (to install an OS and applications). Therefore, in a process of constructing the system environment in a state where a remaining battery capacity is low, there is a case where the power is cut off due to exhaustion of a battery before the system environment is completely constructed and thus the system environment cannot appropriately be constructed.

For example, when a user turns the apparatus ON for the first time, there is a case where it takes about a few tens of minutes to one hour or so to complete a setup of the OS of the system or the application. In this case, there is no problem if the apparatus can be operated on the battery until the setup is completed. However, if the battery is exhausted halfway during the operation, the setup operation is suspended because the power is shut off halfway. Therefore, the setup cannot be completed in a normal manner.

Thus, technologies for preventing a trouble occurring due to the exhaustion of the battery in using an apparatus such as a personal computer are proposed (see, for example, patent documents 1 and 2). According to these technologies, for example, when a user uses a personal computer that is connected to an extension unit and running on battery, a connection warning sound or a connection warning message is issued to prompt the user to connect the personal computer to the power source via an AC adapter.

However, in the technologies as described in Patent documents 1 and 2, etc., the user is prompted to connect the personal computer to the power source via the AC adapter every time the user uses the personal computer. Thus, an operability of the personal computer is impaired.

[Patent document 1] JP 04-010017 A
[Patent document 2] JP 04-123119 A

SUMMARY OF THE INVENTION

An object of the present invention is to provide a technology for securely connecting an electronic apparatus to a non-portable power source without imparting an operability of the electronic apparatus, in processing of preventing a suspension of the processing occurring due to power cutoff caused by exhaustion of the portable power source such as a battery.

In order to solve the problems, the present invention adopts the following means. That is, the present invention provides an electronic apparatus which can be driven by a portable power source and a non-portable power source, including: a judging section for judging, when the electronic apparatus is activated, whether or not the activation is a first activation since the electronic apparatus is shipped from a factory; and an informing section for prompting a user to drive the electronic apparatus by the non-portable power source when the electronic apparatus is driven by the portable power source.

According to the present invention, when it is determined that the electronic apparatus is activated for the first time after shipment of the electronic apparatus from a factory and that the electronic apparatus is driven by the portable power source, the user is prompted to drive the electronic apparatus by the non-portable power source. Therefore, in an operation carried out for the first time after the user starts using the electronic apparatus after the electronic apparatus is shipped from the factory, it is possible to prompt the user to check if the non-portable power source is supplied the electronic apparatus.

The present invention may be a computer program that implements any one of the functions of the electronic apparatus.

Besides, the present invention may be a computer-executable program for causing an electronic apparatus that is supplied with portable power source and can be driven by the portable power source and a non-portable power source to execute: a judging step for judging a power source utilized for driving when a prescribed processing is started; and an informing step for prompting the user to drive the electronic apparatus by the non-portable power source when it is judged in the judging step that the electronic apparatus is driven by the portable power source. Further, the present invention may be a computer-readable recording medium that can be read by an electronic apparatus such as a computer in which the computer-executable program is recorded.

According to the present invention, it is possible to prompt the user to check if the non-portable power source is supplied the electronic apparatus when it is detected that the prescribed processing is started and the electronic apparatus is driven by the portable power supply.

Besides, in a processing of preventing a suspension of the processing occurring due to power cutoff caused by exhaustion of the portable power source such as a battery, it is possible to promote awareness of connecting the electronic apparatus to the non-portable power supply such as a commercial power supply without imparting an operability of the electronic apparatus.

DETAILED DESCRIPTION OF THE INVENTION

Best modes (hereinafter referred to as embodiments) of carrying out the present invention are explained below with reference to the attached drawings. Note that a configuration of the embodiment is described merely as an example, and the present invention is not limited to the configuration of the embodiment.

First Embodiment

Figure 1:
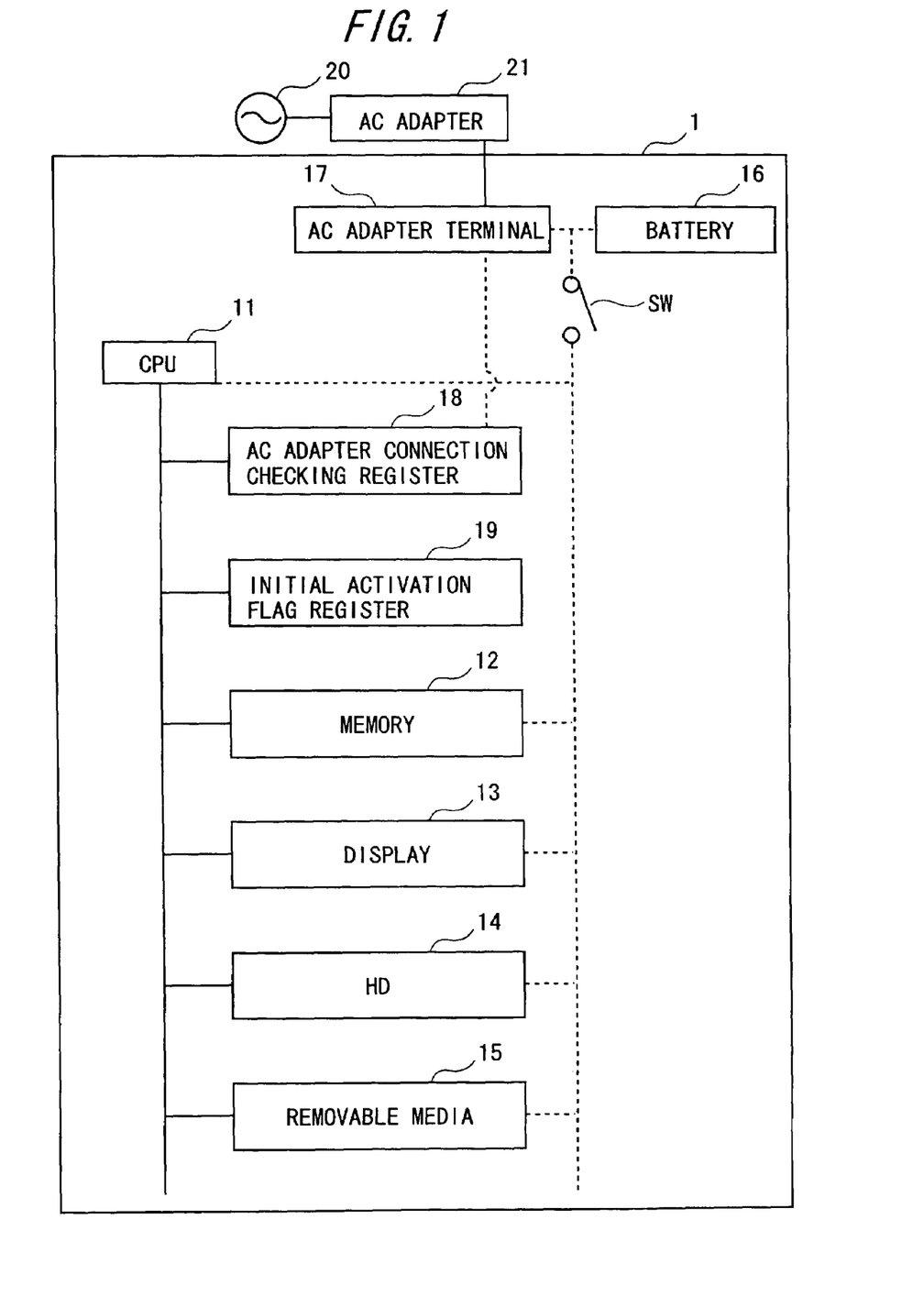
FIG. 1 is a view showing a system configuration of an information processor.

An explanation is made as to an information processor 1 (equivalent to an electronic apparatus of the present invention) according to a first embodiment of the present invention with reference to FIG. 1 through FIG. 4. FIG. 1 is a view showing a system configuration of the information processor 1. The information processor 1 is implemented as a notebook type personal computer, for example. As shown in FIG. 1, the information processor 1 is provided with a CPU 11, a memory 12 connected to an internal bus of the CPU 11, a display 13, a hard disk device 14, a removable media device 15, an AC adapter connection checking register 18, an initial activation flag register 19, a battery 16 for supplying power to the information processor 1 (equivalent to a portable power source of the present invention), an AC adapter terminal 17 (equivalent to an external power supply section according to the present invention) for supplying power to the information processor 1 from an external AC power source 20 such as a commercial power source via an AC adapter 21 (here, the AC power source 20 and the AC adapter 21 are equivalent to a non-portable power source of the present invention, respectively), and a power supply switch SW that connects power wires connected in parallel to each of the battery 16 and the AC adapter terminal 17 so as to be cut off, to each section of the information processor 1.

Note that the information processor 1 is also provided with an input/output interface that connects the display 13, the hard disk device 14, and the removable media device 15 to the internal bus, however, the input/output interface is omitted from FIG. 1. Here, the input/output interface is an interface for connecting a peripheral device to the internal bus. The input/output interface is the interface such as a USB (universal serial bus), an IEEE 1394 interface, a PCMCIA card interface, an ATA (AT attachment) interface, a SCSI (small computer system interface), and a PCI (peripheral component interconnect). In addition, the information processor 1 is further provided with a communication interface that communicates with a node on a network, however, the communication interface is omitted from FIG. 1.

The CPU 11 executes an OS developed on the memory 12 or various kinds of application programs and provides a function as the information processor 1.

On the memory 12, the various kinds of programs stored in the hard disk device 14 or the removable media device 15 are developed and held in an executable form by the CPU 11. Besides, the memory 12 stores various kinds of data that is processed by the CPU 11.

The display 13 displays information such as a result of the processing by the CPU 11. The display 13 is, for example, a liquid crystal display. The hard disk device 14 stores therein the OS, the various kinds of application programs, the data that is processed by the CPU 11, the data of the result of the processing by the CPU 11, and the like.

The removable media device 15 is mounted with a removable media such as, for example, a CD, a DVD. The data is inputted and outputted between the media and the memory 12 or between the media and the hard disk device 14. Note that the removable media device 15 may be a flexible disk drive, an adapter of a flash memory card, and the like, for example. In addition, the removable media device 15 may be a device that is externally mounted onto the information processor 1 via the input/output interface (not shown).

The power supply switch SW connects or cuts off the power wires connected in parallel to each of the battery 16 and the AC adapter terminal 17 to or from each section of the information processor 1 in accordance with an operation by the user.

The battery 16 supplies power to each section of the information processor 1 through the power supply switch SW. Besides, the battery 16 is capable of storing DC power generated by conversion from AC power through the AC adapter 21 connected to the AC adapter terminal 17. That is, the AC adapter terminal 17 supplies the DC power generated by conversion from the AC power source 20 to the battery 16 and also supplies power to each section of the information processor 1 through the power supply switch SW. Accordingly, in a state where it is possible to supply power from the AC power source 20 to the information processor 1 via the AC adapter 21, the information processor 1 is supplied with sufficient power regardless of a state of charge of the battery 16.

The AC adapter connection checking register 18 retains a value "1" or "0" in accordance with a state of the AC adapter terminal 17 and allows the CPU 11 to read the value. For example, when the DC power is supplied from the AC adapter 21, the AC adapter connection checking register 18 retains the value "1" that indicates an ON state. Besides, when the DC power is not supplied from the AC adapter 21, the AC adapter connection checking register 18 retains the value "0" that indicates an OFF state. The CPU 11 reads the value of the AC adapter connection checking register 18 through the internal bus and determines a state of power supply from the AC adapter 21. The CPU 11 that carries out the processing and the AC adapter connection checking register 18 are equivalent to a connection determining section of the present invention.

The initial activation flag register 19 is configured by a non-volatile memory (for example, a flash memory). When the information processor 1 is shipped from a factory, a value (for example, "1") that indicates an initial activation is set as the initial activation flag register 19. The CPU 11 that judges the value of the initial activation flag register 19 and the initial activation flag register 19 are equivalent to judging sections of the present invention.

The CPU 11 judges whether or not the information processor 1 is in a state of an initial activation after shipment by referring to the initial activation flag register 19. In addition, the CPU 11 clears the initial activation flag register 19 when a prescribed processing, for example, a setup processing, is completed after the initial activation.

Thus, the CPU 11 confirms a connection to the AC adapter 21 at the initial activation and prompts the user to supply power from the AC power source 20 via the AC adapter 21 in a case where power is not supplied to the AC adapter terminal 17. In other words, the CPU 11 allows a prescribed message to be displayed on the display 13 and prompts the user to connect the information processor 1 to the AC power source 20 with the AC adapter 21. The CPU 11 that carries out the processing and the display 13 are equivalent to informing sections of the present invention.

Figure 2:
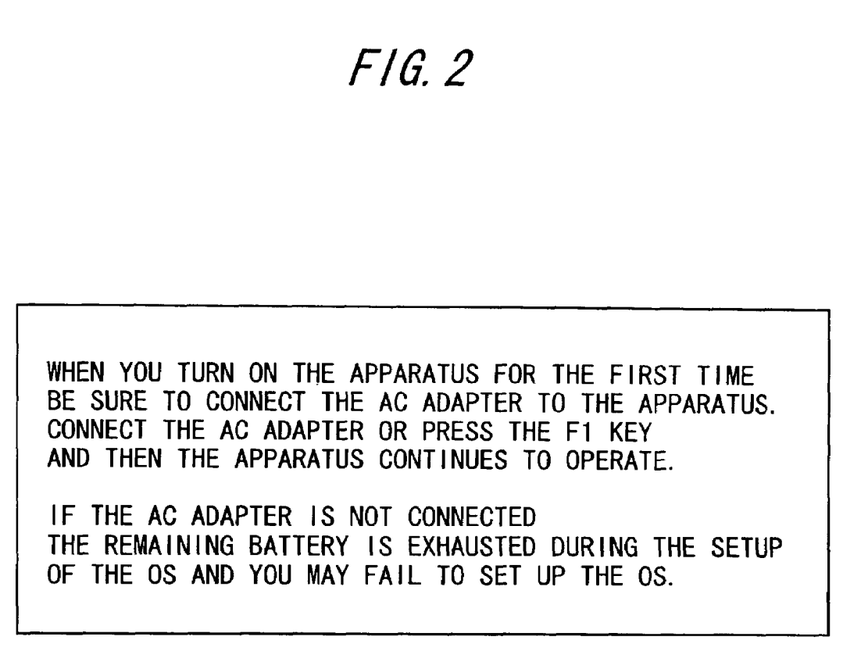
FIG. 2 is a view showing an example of a message that prompts a user to supply power from an AC power source via an AC adapter.

FIG. 2 shows an example of the message in this case. That is, the message "When you turn on the power to the apparatus for the first time, be sure to connect the AC adapter to the apparatus. Connect the AC adapter or press the F1 key, and then the apparatus continues to operate. If the AC adapter is not connected, the remaining battery is exhausted during the setup of the OS, and you may fail to set up the OS." is displayed.

Accordingly, when the user turns on the power to the information processor 1 to activate a system for the first time after obtainment of the information processor 1 after shipment from the factory, and operates the power supply switch SW, it is confirmed that the power is surely supplied through the AC adapter 21. That is, when the power is not supplied through the AC adapter 21, the user connects the AC adapter 21 to the AC power source 20 and further connects the AC adapter 21 to the AC adapter terminal 17.

As a result, in the setup processing carried out after the user activates the information processor 1 for the first time after shipment from the factory, it is more likely that the power is surely supplied from an external power source (the AC power source 20 of FIG. 1, and the like) other than the battery 16. Then, in the setup operation, (1) confirmation of a license agreement, (2) registration of various kinds of information to the OS, (3) registration of a computer name, (4) registration of a user name, (5) installation of a selectable application, (6) operation for participating in a domain, (7) operation for connecting to the Internet, (8) user registration via a web site of a manufacturer, and the like are carried out without a power cutoff caused by a shortage in battery charge.

Here, the registration of various kinds of information to the OS is a registration of control parameters by performing a setting as to whether or not the OS is automatically updated via the Internet, for example. When an automatic updating is set, the information processor 1 periodically accesses the web site of the manufacturer on the Internet, and when a file for updating the OS is provided, the information processor 1 downloads the file for updating and then updates the OS of its own apparatus.

The computer name is a computer name (also referred to as a node name) that is recognized by other information processors on a LAN. The user name is each of the individual user names in the OS which supports a multiuser environment.

The selectable application is a necessary application depending on peripheral devices, for example, an installable application depending on the peripheral devices, and the like. The application is installed after being confirmed by the user.

The operation for participating in the domain is a processing for causing the information processor 1 to participate in the domain defined as an aggregate of a plurality of computers on a network. In the processing, the processing is carried out in accordance with the domain name, the user name, and a password inputted by the user.

The operation for connecting to the Internet is an operation for connecting the information processor 1 to the Internet. In performing the setting, the user selects a connection form from among alternatives of usable network interfaces (DSL, LAN, an analog modem, and the like) and inputs and performs a setting of information unique to the selected connection form (for example, as an analog modem, a telephone number at an access point, an address information of its own terminal, and the like, as a LAN, an IP address and the like) and information common to each connection form. By performing the setting, the connection to the Internet becomes possible. Further, when the user registers with the manufacturer of the OS as a user, the information processor 1 carries out an operation for inputting and setting user information while transmitting and receiving the information to and from a server of the manufacturer of the OS, in accordance with the operation by the user.

Figure 3:
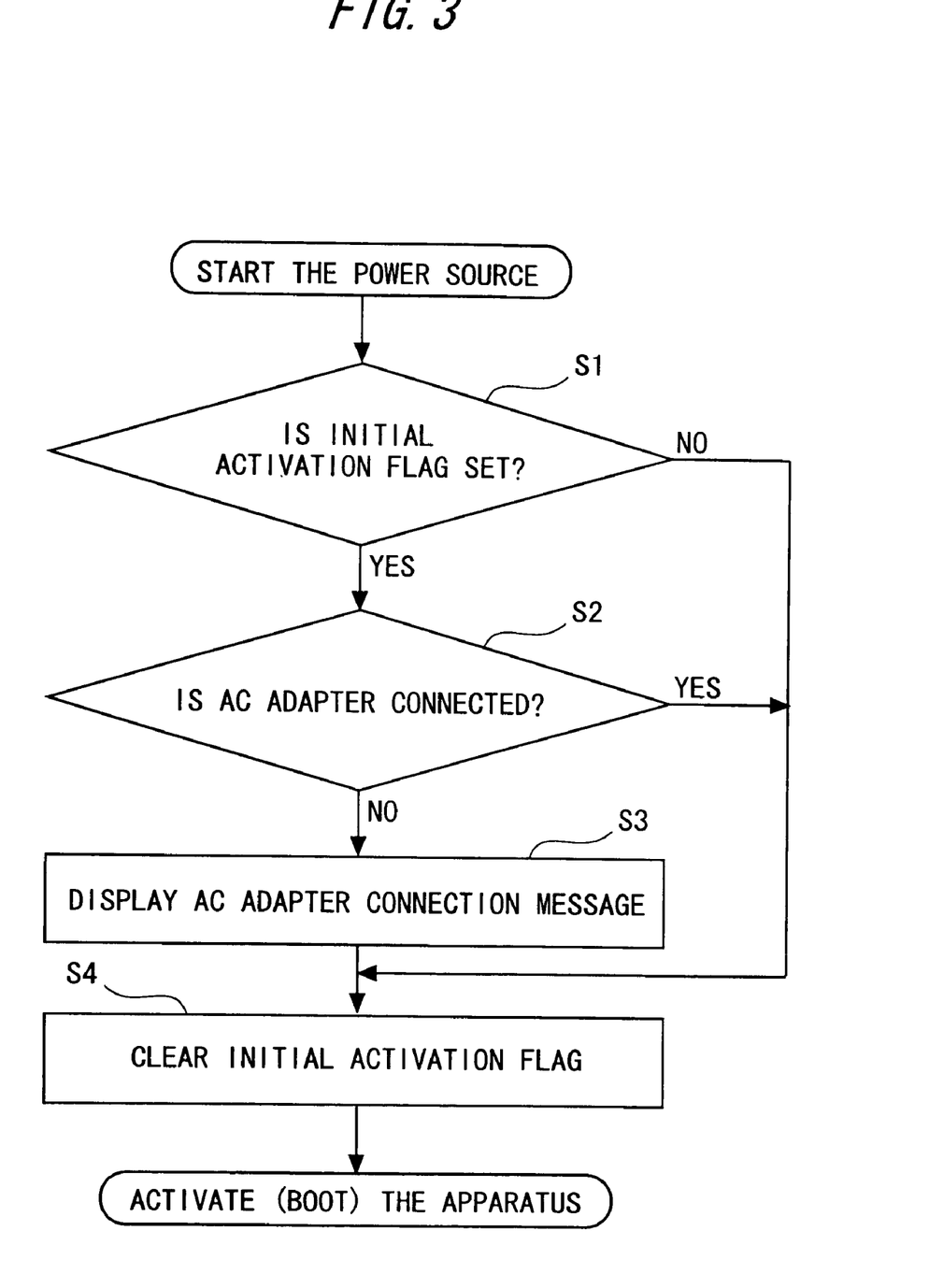
FIG. 3 is a flow chart showing a processing of the information processor that is carried out after the information processor is activated by a user for the first time since the information processor is shipped from a factory.

FIG. 3 is a flow chart showing a processing by the information processor 1 that is carried out after the user activates the information processor 1 for the first time after shipment from the factory. The processing is implemented by execution by the CPU 11 of a computer program stored in the hard disk device 14 or a ROM (read only memory) (not shown) of the information processor 1.

When the power supply switch SW of the information processor 1 is turned ON, the processing shown in FIG. 3 is carried out. In the processing, the CPU 11, first, refers to the initial activation flag register 19 and judges whether or not the initial activation flag is set (step S1). If the initial activation flag is not set, it is judged by the CPU 11 that the activation is not the initial activation, and the control proceeds to a processing of step S4.

On the other hand, if the initial activation flag is set, the CPU 11, next, refers to the AC adapter connection checking register 18, and judges whether or not the power is supplied to the AC adapter terminal 17 from the AC adapter 21 (step S2). If the power is supplied to the AC adapter terminal 17 from the AC adapter 21, the control of the CPU 11 proceeds to a processing of step S4.

Meanwhile, when the power is not supplied to the AC adapter terminal 17 from the AC adapter 21, the CPU 11 allows a message for connection of the AC adapter to be displayed (step S3). Further, the CPU 11 clears the initial activation flag register 19 (step S4). Subsequently, the CPU 11 activates the information processor 1. Then, the setup processing after shipment from the factory and the like are carried out.

Thus, the information processor 1 judges whether or not the power is supplied to the AC adapter terminal 17 from the AC adapter 21 when the user activates the information processor 1 for the first time after shipment from the factory. If the power is not supplied to the AC adapter terminal 17 from the AC adapter 21, the CPU 11 allows the AC adapter connection message to be displayed. As a result, a possibility that the processing carried out for the first time after shipment from the factory is continued under a state where the information processor 1 is driven by the battery 16 can be reduced. Therefore, a risk that the power is cut off due to the shortage in battery charge of the battery 16 and thereby the information processor 1 is suspended during the setup processing carried out after the AC adapter connection message is displayed can be reduced.

In the setup processing after the shipment from the factory, (1) the confirmation of a license agreement, (2) the registration of various kinds of information to the OS, (3) the registration of a computer name, (4) the registration of a user name, (5) the installation of a selectable application, (6) an operation for participating in a domain, (7) a operation for connecting to the Internet, (8) a user registration via the web site of a manufacturer, and the like are carried out. Accordingly, it is likely that a critical problem such as difficulty in restarting the information processor 1 arises. According to the information processor 1 of the present invention, a possibility to prevent such problem from occurring can be increased.

Further, the CPU 11 clears the initial activation flag register 19 after the AC adapter connection message is displayed. Accordingly, because the initial activation flag is already OFF when the information processor 1 is turned on, the AC adapter connection message is no longer displayed. Consequently, the AC adapter connection message is not displayed and the connection of the AC adapter 21 is not prompted each time the information processor 1 is used by the user or each time the information processor 1 is activated. Thus, a situation where an operability of the information processor 1 is impaired for secure connection of the AC adapter 21 can be prevented from occurring.

Second Embodiment

Hereinbelow, an information processing program according to a second embodiment of the present invention is explained with reference to FIG. 4. In the first embodiment, the explanation is made as to the information processor 1 that judges whether or not the power is supplied to the AC adapter terminal 17 from the AC adapter 21 at the time of the first activation of the information processor 1 after the shipment of the information processor 1. In the first embodiment, it is intended to prevent the power cutoff caused by the shortage in battery charge of the battery 16 during execution of the setup processing after the user activates the information processor 1 for the first time after the shipment from the factory.

However, the problem of the power cutoff may not necessarily occur only during the setup processing after the shipment from the factory. There is a fear to cause a critical problem if the power is cut off due to the shortage in battery charge of the battery 16 at the time of construction of the system, for example, reinstallation of the OS and upgrading of the OS. On the other hand, however, if the information processor 1 prompts the user to connect the AC adapter 21 to the information processor 1 every time the user uses the information processor 1, the operability of the information processor 1 is significantly deteriorated just as in the case of the conventional technologies.

In this regard, in the second embodiment, an explanation is made as to the computer program that judges whether or not the power is supplied to the AC adapter terminal 17 from the AC adapter 21 when or before a specific processing is carried out and prompts the user to connect the AC adapter 21 to the information processor 1 when the AC adapter 21 is not connected to the information processor 1. The processing is, for example, a processing of reinstalling the OS. Accordingly, it is enough to embed the processing of the second embodiment at the leading of the program for executing reinstallation of the OS. In addition, the processing is a processing for upgrading the OS. Accordingly, it is enough to embed the processing of the second embodiment at the leading of the program for executing upgrading of the OS. Besides, it is enough to store the processing step at the leading of the recording medium (a removable medium such as a CD or a DVD) onto which the program is recorded.

Figure 4:
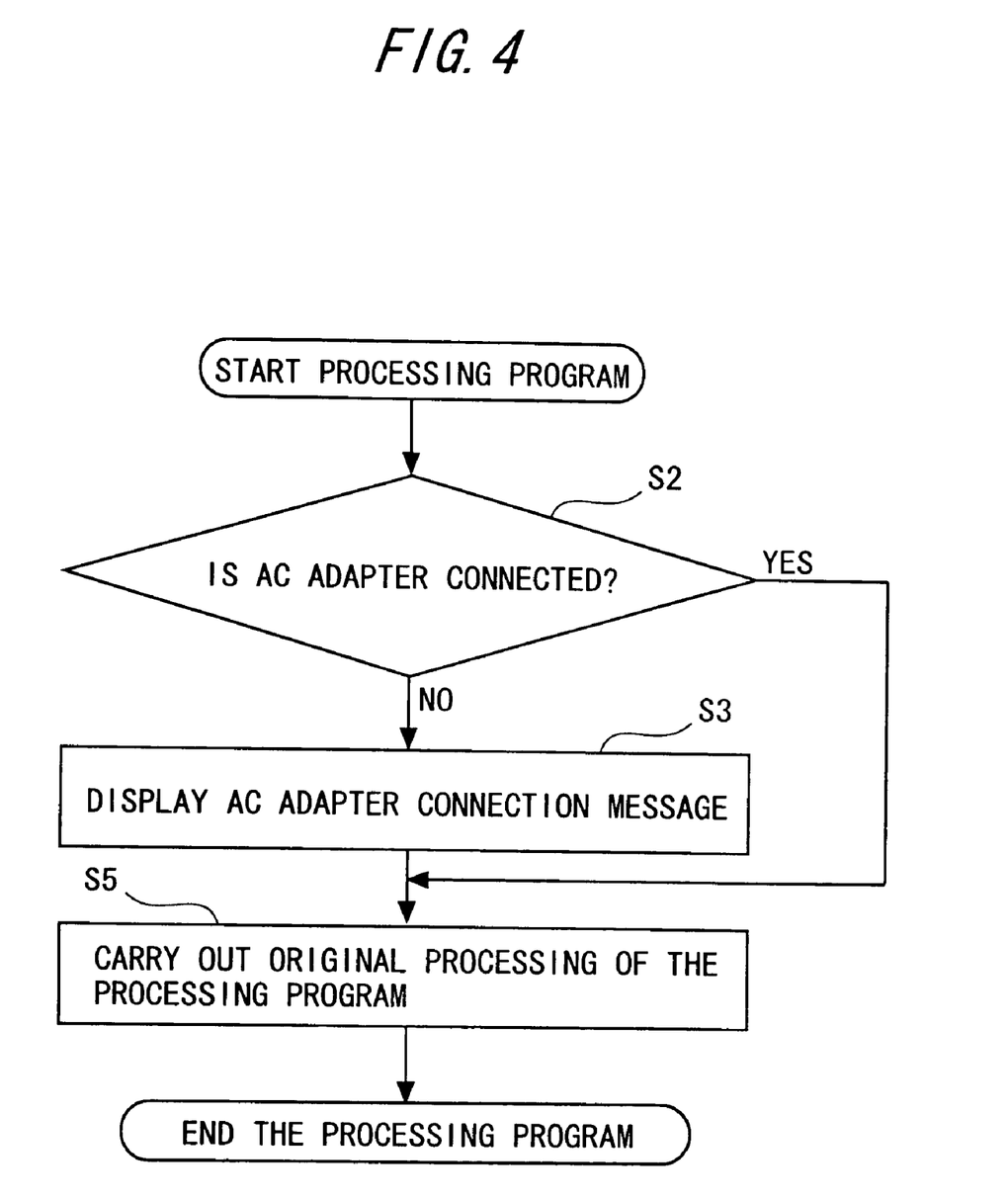
FIG. 4 is a flow chart of a processing program for executing a critical processing or a long-time processing.

FIG. 4 shows a flow chart of a processing program according to the second embodiment. The processing is equivalent to the processing at the time of reinstallation of the OS or the processing at the time of the start of the program that executes upgrading of the OS of the information processor 1 as explained in the first embodiment. In addition, the processing as shown in FIG. 4 may be carried out at the leading of the program that executes the processing that requires a long time until the completion of the processing such as an installation processing of an application program of a large data size or a restoration processing of the hard disk device 14 from a backup file.

In the processing, the CPU 11, first, refers to the AC adapter connection checking register 18, and then judges whether or not the power is supplied to the AC adapter terminal 17 from the AC adapter 21 (step S2). If it is judged that the power is supplied to the AC adapter terminal 17 from the AC adapter 21, the CPU 11 allows an original processing of the processing program to be carried out. Here, the original processing is a processing such as reinstallation of the OS, upgrading of the OS, installation of the application program of a large data size, or restoration of the hard disk device 14 from the backup file.

Meanwhile, when the power is not supplied to the AC adapter terminal 17 from the AC adapter 21, the CPU 11 allows a message for connection of the AC adapter to be displayed (step S3). Subsequently, the CPU 11 carries out the original processing of the processing program (step S5).

Thus, according to the processing program of the second embodiment, in carrying out a predetermined processing, for example, the processing in which a critical problem (critical processing) arises if the power cutoff occurs during the processing such as the reinstallation of the OS and the upgrading processing of the OS or the processing that requires a long time until the completion of the processing such as the installation of the application program of a large data size or restoration of the hard disk device 14 from the backup file (long-time processing), the information processor 1 judges whether or not the power is supplied to the AC adapter terminal 17 from the AC adapter 21. Besides, if the power is not supplied to the AC adapter terminal 17 from the AC adapter 21, the CPU 11 allows the AC adapter connection message to be displayed. Consequently, the possibility that the critical processing or the long-time processing is continued to be carried out in a state where the information processor 1 is driven by the battery 16 can be reduced.

Further, according to the processing program of the second embodiment, the judgment as to whether the power is supplied to the AC adapter terminal 17 from the AC adapter 21 is carried out during the execution of the processing program that implements the prescribed processing such as the critical processing or the long-time processing. Accordingly, in executing the program other than the processing program into which the processing as shown in FIG. 4 is incorporated, the AC adapter connection message is not displayed. Consequently, the AC adapter connection message is not displayed and the connection of the AC adapter 21 is not prompted each time the information processor is used 1 by the user. Thus, a situation where an operability of the information processor 1 is impaired for secure connection of the AC adapter 21 can be prevented.

Note that a portion of the processing program that carries out the processing as shown in FIG. 4 may be stored at the leading of the removable medium. That is, the processing as shown in FIG. 4 may also be applied in a case where the program is read and executed from the removable medium that includes the critical processing or the long-time processing.

<<Computer-Readable Recording Medium>>

The program that implements any of the functions on the computer or other machines or devices (hereinafter referred to as computer and the like) can be recorded onto a recording medium readable by the computer and the like. Besides, the function can be provided to the computer and the like by causing the computer and the like to read and execute the program recorded onto the recording medium.

Here, the recording medium readable by the computer and the like refers to the recording medium that stores information such as data or a program electrically, magnetically, optically, mechanically, or by a chemical action, which can be read from the computer and the like. Among the recording media, examples of the recording medium that can be removed from the computer and the like include a flexible disk, a magneto-optical disk, a CD-ROM, a CD-R/W, the DVD, a DAT, an 8 mm tape, and a memory card.

Besides, examples of the recording medium that is fixed in the computer and the like include a hard disk and a ROM (read only memory).

<Others>

The disclosures of Japanese patent application No. JP2005-252144 filed on Aug. 31, 2005 including the specification, drawings and abstract are incorporated herein by reference.

What is claimed is:

1. An electronic apparatus which can be driven by a portable power source or a non-portable power source, comprising:
    a determination section configured to determine whether the electronic apparatus receives power from the non-portable power source, when a predetermined processing is carried including one or more of a reinstallation of an operating system, an upgrade processing of the operating system, installation of an application program of large data size, restoration from a back up file, and a setup process including judging the electronic apparatus activation is a first activation since the electronic apparatus shipped from a factory; and
    an informing section configured to prompt a user to supply the power from the non-portable power source to the electronic apparatus, when determination section upon the predetermined processing determines the electronic apparatus does not receive the power from the non-portable power source.

2. The electronic apparatus according to claim 1, wherein the portable power source is a battery cell and the non-portable power source is an external power source.

3. A computer-readable recording medium recording a computer-executable program for controlling an electronic apparatus which can be driven by a portable power source or a non-portable power source to execute operations comprising:
    determining whether the electronic apparatus receives power from the non-portable power source, when a predetermined processing is carried including one or more of a reinstallation of an operating system, an upgrade processing of the operating system, installation of an application program of a large data size, restoration from a backup file, and a setup process including judging the electronic apparatus activation is a first activation since the electronic apparatus shipped from a factory; and
    prompting a user to supply the power from the non-portable power source to the electronic apparatus, when the determining upon the predetermined processing determines the electronic apparatus does not receive the power from the non-portable power source.

4. The computer-readable recording medium recording the computer-executable program according to claim 3, wherein the portable power source is a battery cell and the non-portable power source is an external power source.

5. An informing method used for an electronic apparatus which can be driven by a portable power source or a non-portable power source, comprising:
    determining whether the electronic apparatus receives power from the non-portable power source, when a predetermined processing is carried including one or more of a reinstallation of an operating system, an upgrade processing of the operating system, installation of an application program of a large data size, restoration from a backup file, and a setup process including judjinj the electronic apparatus activation is a first activation since the electronic apparatus shipped from a factory; and
    prompting a user to supply the power from the non-portable power source to the electronic apparatus, when the determining upon the predetermined processing determines the electronic apparatus does not receive the power form the non-portable power source.

6. The informing method according to claim 5, wherein the portable power source is a battery cell and the non-portable power source is an external power source.

7. An electronic apparatus which can be driven by a portable power source a non-portable power source, comprising:
    a determination section configured to determine a power source that is currently utilized for driving the electronic apparatus when a predetermined processing is started including one or more of a reinstallation of an operating system, an upgrade processing of the operating system, installation of an application program of a large data size, restoration from a backup file, and a setup process including judging the electronic apparatus activation is a first activation since the electronic apparatus shipped from a factory; and
    an informing section configured to prompt a user to drive the electronic apparatus by the non-portable power source when it is judged by the determination section upon the predetermined processing that the electronic apparatus is being driven by the portable power source.

8. The electronic apparatus according to claim 7, wherein the portable power source is a battery cell and the non-portable power source is an external power source.

9. A computer-readable recording medium recording a computer-executable program controlling an electronic apparatus which can be driven by a portable power source or a non-portable power source to execute operations comprising:
    determining a power source that is currently utilized for driving the electronic apparatus when a predetermined processing is started including one or more of a reinstallation of an operating system, an upgrade processing of the operating system, installation of an application program of a large data size, restoration from a backup file, and a setup process including judging the electronic apparatus activation is a first activation since the electronic apparatus shipped from a factory; and
    prompting a user to drive the electronic apparatus by the non-portable power source when it is judged by the determining upon the predetermined processing that the electronic apparatus is being driven by the portable power source.

10. The computer-readable recording medium recording a computer-executable program according to claim 9, wherein the portable power source is a battery cell and the non-portable power source is an external power source.

11. An informing method used for an electronic apparatus which can be driven by a portable power source or a non-portable power source, comprising:
    determining a power source that is currently utilized for driving the electronic apparatus when a predetermined processing is started including one or more of a reinstallation of an operating system, an upgrade processing of the operating system, installation of an application program of a large data size, restoration from a backup file, and a setup process including judging the electronic apparatus activation is a first activation since the electronic apparatus shipped from a factory; and
    prompting a user to drive the electronic apparatus by the non-portable power source when it is judged by the determining upon the predetermined processing that the electronic apparatus is being driven by the portable power source.

12. The informing method according to claim 11, wherein the portable power source is a battery cell and the non-portable power source is an external power source.

* * * * *

UNITED STATES PATENT AND TRADEMARK OFFICE
CERTIFICATE OF CORRECTION

PATENT NO. : 7,615,886 B2 Page 1 of 1
APPLICATION NO. : 11/311231
DATED : November 10, 2009
INVENTOR(S) : Naoki Iwasa et al.

It is certified that error appears in the above-identified patent and that said Letters Patent is hereby corrected as shown below:

Column 9, Line 56, change "judjinj" to --judging--.

Signed and Sealed this

Second Day of February, 2010

David J. Kappos
*Director of the United States Patent and Trademark Office*